May 28, 1935.  E. C. VROOMAN  2,003,225
GUY INSULATING AND GRADING MEANS
Original Filed Sept. 4, 1930   2 Sheets-Sheet 1
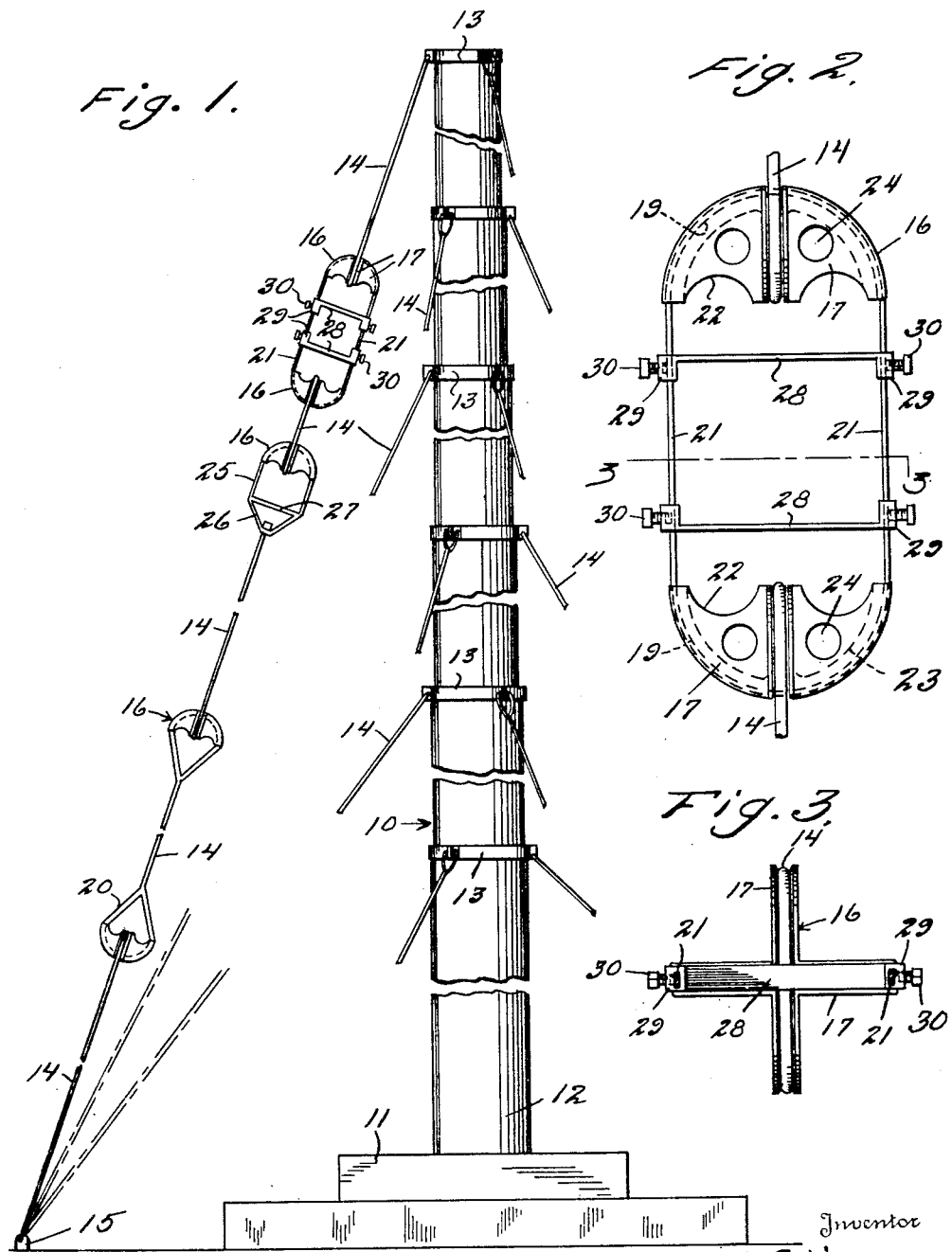
Inventor
Edward C. Vrooman
By
Attorney May 28, 1935.  E. C. VROOMAN  2,003,225
GUY INSULATING AND GRADING MEANS
Original Filed Sept. 4, 1930  2 Sheets-Sheet 2
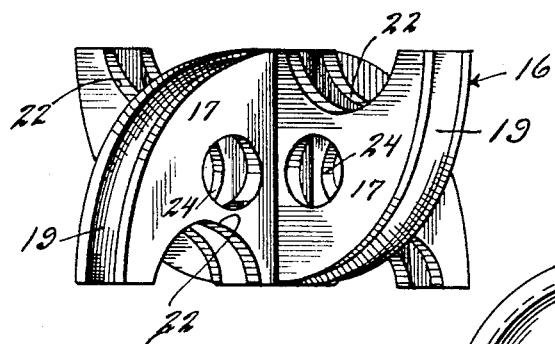
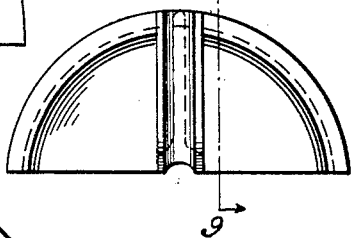
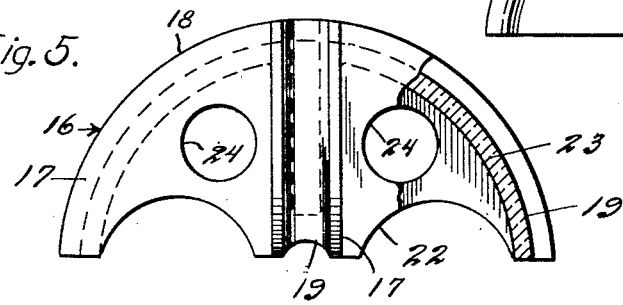
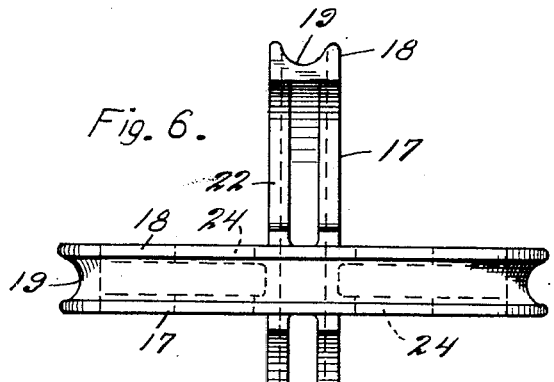
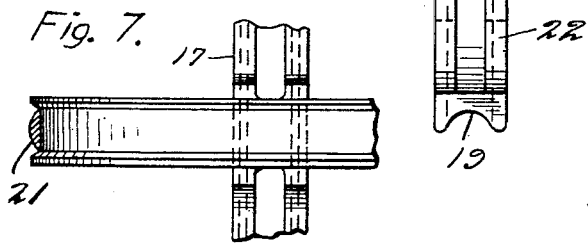
Inventor
Edward C. Vrooman
By
Attorney Patented May 28, 1935

2,003,225

UNITED STATES PATENT OFFICE 2,003,225

GUY INSULATING AND GRADING MEANS

Edward C. Vrooman, Schenectady, N. Y., assignor to Locke Insulator Corporation, Baltimore, Md., a corporation of Maryland Original Application September 4, 1930, Serial No. 479,755. Divided and this application August 24, 1932, Serial No. 630,266

7 Claims. (Cl. 173—366)

This application is a division of my co-pending application for Guy insulating and grading means, filed September 4, 1930 and given Serial No. 479,755.

The invention relates to strain insulators particularly adapted for use in connection with an aerial mast intended to be used as an antenna in radio communication, the use being, however, not limited in this respect as a wide variety of uses will naturally suggest themselves.

It is easily conceivable that a tall mast constructed of course of metal is quite suitable for employment as an antenna for sending out radio frequency currents. However, in the case of a mast used for such purpose it is quite apparent that it must be insulated from the ground. The problem presented in case of a small or light installation is comparatively minor, but in the case of a very large and heavy mast, a serious problem presents itself, namely the effective guying of the structure while maintaining it in insulated relation to the ground. Furthermore while the ordinary type of guy strain insulator may be suggested as a solution, the fact remains that arranging or locating in the field about mast the necessary number of insulators of this type of a bulk sufficient to withstand the mechanical strains imposed upon them affects the electrostatic field and not only upsets the balance but causes serious losses.

It is with the above facts in view that I have devised the present invention which has for its general object the provision of a novel arrangement of strain insulators, and also a novel construction of the insulators themselves, for interposition in the guys for an aerial mast to be used as an antenna, or for any other possible purpose—such for instance as the suspension of an antenna, a high tension transmission conductor, or the like.

An important object of the invention is to provide guy strain insulators of peculiar construction so that they will have the minimum bulk while yet possessing sufficient strength to support or sustain the load imposed upon them, the reduction in the bulk correspondingly reducing the losses.

Another important object of the invention is to provide a guy strain insulator arrangement embodying di-electric and metallic elements, the latter being so arranged with respect to the former as to bring about the proper potential gradient along the guys so that the electrostatic field about the mast and guys may be kept uniform, thereby preventing the concentration of electrical stresses which if unchecked might seriously interfere with the action, it being remembered that high frequency or radio currents, with their peculiar characteristics, are to be handled.

Another object of the invention is to provide a guy strain insulator arrangement embodying porcelain and metallic parts between which the spacing may be varied so as to establish a proper potential gradient necessary to provide an insulated support for any type of radio or high frequency apparatus which would require an insulated support having the mechanical characteristics of a suspension insulator.

A still further object is to provide a guy strain insulator construction and arrangement which will be simple and inexpensive to construct and assemble, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of an aerial mast, portions of the successive sections being broken away, and portions of the guys being broken away, but showing one complete guy with strain insulators therein constructed in accordance with various forms of the invention, Figure 2 is a side elevation of the adjustable type of strain insulator, Figure 3 is a horizontal cross section taken on the line 3—3 of Figure 2.

Figure 4 is a side elevation of one of the insulating units alone,

Figure 5 is an elevation thereof taken at right angles to Figure 4,

Figure 6 is a plan view,

Figure 7 is a fragmentary section showing the seat construction employed in Figure 2, Figure 8 is a side elevation of one element showing a modification, and Figure 9 is a cross section on the line 9—9 of Figure 8.

Referring more particularly to the drawings, I have shown an aerial mast indicated as a whole by the numeral 10 mounted upon and insulated from a suitable base or foundation 11 and formed of a plurality of superposed sections 12 which may be of any desired number and length and secured together in any preferred manner. Obviously it is necessary to guy a mast of such a type and I have therefore shown it as equipped at intervals with peripheral bands 13 having ears thereon to which are connected guys 14 which are in turn to be connected with some suitable anchors 15 securely fastened with respect to the ground. As it is intended that the mast be insulated it becomes necessary to interpose insulating means within the guys and the present invention has to do with the construction and arrangement of this particular means.

In accordance with my invention I plan to use peculiarly constructed guy strain insulators which may be used alone or which may be combined with metallic elements, certain of which may be adjusted, so as to balance the electrostatic field or to establish the proper potential gradient. Figures 4, 5 and 6 show these individual guy strain members 16 in detail while Figure 1 shows them interposed in a guy either alone or combined with the metallic elements referred to. Each member 16 may be said to comprise two semicircular or substantially crescent shaped portions 17 arranged at right angles to each other so as to be X-shaped or cruciform in top or bottom plan. These portions are of course integral with each other and the arrangement is such that the convex edge 18 of each portion is opposite the convex side or edge of the other. In other words the convex edge of one portion is at the sides and top while the convex edge of the other portion extends from the sides around the bottom. These convex edges are shown as grooved at 19 for the reception of bridles 20 formed in or connected with the guy, or for the reception of metallic loop or bridle members 21 as shown at the upper portion of Figure 1 and in greater detail in Figure 2. The grooves may be flat in cross section as in Figure 7 if preferred. For the sake of reducing the bulk of the members 16, which incidentally are preferably formed of porcelain, the edges opposite the convex edges 18 may be cut away as shown at 22. As another means for reducing the mass of dielectric material the portions 17 are preferably concaved or dished out at their sides as shown in Figures 8 and 9 though they may be made hollow extending from the cut away edges as shown in Figures 4, 5 and 6 so as to leave only comparatively thin bearing portions 23 which are engaged by the bridles 20 or 21 as the case may be. In either event, but especially in view of the thinness of the material at these bearing seats if the second plan be adopted, it is advisable to provide a liner of lead or other ductile metal or material for instance as shown in either of the patents to Gouverneur No. 1,712,-556 granted May 14th, 1929 and covering improvements in Insulator suspension links, or No. 1,712,557 granted May 14th, 1929 and covering improvements in Link liners, the idea being that such material may flow or creep under strain and cause an equalization of the strains brought upon the dielectric material by the bridles instead of permitting these strains to be concentrated at any high spots, all as pointed out in the patents referred to. Further lightening of the porcelain members may be effected by forming them with transverse holes 24 as clearly indicated in Figures 4 to 6.

Assuming that the individual members 16 have been constructed as shown and described, it is clear that any necessary or desired number thereof may be interposed in each of the guys 14 and it is also apparent that these members may be spaced apart at any distances found suitable by the simple plan of using shorter or longer bridles or guy elements or sections, the number of insulating members depending upon the electrical potential to be borne by them and their spacing depending upon the frequency or potential of the electro-static field about the mast. Instead of using the bridles or guy sections 20 alone or directly, use may be made of a somewhat frame-like bridle member 25 having one end embracing the convex edge 18 of one portion 17 of an insulator 16 and its other end connected with a guy section or bridle as shown at 26 in Figure 1, a transverse member 27 being provided between the arms of the member 25 to prevent collapsing.

A very important feature of the invention is the arrangement for adjusting the capacity effect more accurately than by the simple scheme of initially spacing the insulating members a certain predetermined distance apart. Figure 2 shows this arrangement in ample detail to give a thorough understanding of the invention in this respect. Referring to this figure, it is of course clear that there are two of the members 16 used connected by the bridle member 21 above described. The distinctive characteristic of this modification is the provision of a pair of transverse metallic members 28 extending across the bridle 21 and adjustable longitudinally thereof with respect to each other and to the insulators 16. The mechanical construction permitting this is simple and it may comprise merely bosses 29 on the ends of the members 28, the bosses being apertured so as to be slidable along the sides of the member 21, securing at any adjusted position being effected as by means of set screws 30.

In assembling the structure, any one of the arrangements above referred to, or any combination of such arrangements, for instance as shown in Figure 1, may be resorted to in connection with each guy and it is apparent that when all of the guys are connected with the successive bands 13 on the mast and are in turn connected with the anchors 15 the mast will be adequately supported. By properly positioning the successive strain insulator units 16 throughout the length of each guy I have found that the capacity effect of the insulators may be substantially modified and taken advantage of for the proper grading of the electro-static field about the mast, or other apparatus which is supported by this device. In connection with the subject of grading of insulators reference might well be had to the patent to Peek granted December 31st, 1929, covering improvements in Insulating supports, and numbered 1,741,333, which patent contains a discussion of the principles involved in connection, at least, with the grading of a series of insulators. Other art on this general subject is also available. However, it is one of the important features of my invention that the bulk or mass of porcelain is reduced to the minimum, it being well known that if large masses were employed in the manner set forth in this application there would be a most undesired effect on the radio frequency currents handled. This is particularly true on account of the present day tendency to employ extremely short wave lengths in radio transmission, the frequencies being high and the losses in the porcelain being correspondingly great. The need for proper grading is of course necessarily more acute.

At the same time, due regard has been given to the question of insuring adequate mechanical strength of the insulator units to withstand the rather severe loads to which they are subjected and which would unavoidably be very grave in case of an unusually high mast. This is a point of importance when it is considered that a mast for the purpose set forth may easily have a height of, say, six hundred feet or so.

Concluding, it is believed from the foregoing description and a study of the drawings that the construction, operation and advantages should and will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A strain insulator comprising a unitary body of dielectric material including a pair of substantially crescent shaped portions intersecting at right angles with their outer edges of oppositely curved convex shape and grooved, the other edges being of hollow form to define relatively thin wall portions at the base of the grooves in the convex edges.

2. A strain insulator comprising a unitary body of dielectric material including a pair of substantially crescent shaped portions intersecting at right angles with their outer edges of oppositely curved convex shape and grooved, the other edges being of hollow form to define relatively thin wall portions at the base of the grooves in the convex edges, and said second named edges being partially cut away to reduce the weight.

3. A strain insulator comprising a unitary body of dielectric material including a pair of substantially crescent shaped portions intersecting at right angles with their outer edges of oppositely curved convex shape and grooved, the other edges being of hollow form to define relatively thin wall portions at the base of the grooves in the convex edges, said second named edges being partially cut away to reduce the weight, and said portions being apertured to reduce the bulk of the dielectric material.

4. A guy strain insulator comprising a pair of strain insulator elements each having interlinking curved seats, metallic bridle members engaging about corresponding seats, a pair of metallic elements carried by one of said bridle members and slidably adjustable toward and from each other therealong, and means for maintaining an adjusted position.

5. A guy strain insulator comprising a pair of strain insulator elements each having interlinking curved seats, a metallic bridle member connecting said elements and engaging about corresponding seats, and a plurality of metallic elements extending across and connecting the sides of the bridle member in cooperative relation to each other to grade the electro-static field, said metallic elements being shiftable to vary their distance apart and their distance from the insulator elements.

6. A guy strain insulator comprising a pair of strain insulator elements each having interlinking curved seats, a metallic bridle member engaging about corresponding seats, and a plurality of metallic elements extending across and carried by the bridle member and adjustable therealong with respect to each other independently of a next adjacent insulator.

7. A guy strain insulator comprising a pair of strain insulator elements each having interlinking curved seats, a metallic bridle member engaging about corresponding seats, a plurality of metallic elements bridging the bridle member and having terminal sleeve portions slidable along the sides thereof whereby the metallic elements may be adjusted toward or from each other and with respect to the adjacent insulator elements, and means carried by said sleeve portions and engageable with the sides of the bridle member for maintaining an adjusted position.

EDWARD C. VROOMAN.